United States Patent [19]
Cullen et al.

[11] Patent Number: 5,995,978
[45] Date of Patent: Nov. 30, 1999

[54] NAVIGATION SYSTEM FOR DOCUMENT IMAGE DATABASE

[75] Inventors: John F. Cullen, Redwood City; Jonathan J. Hull, Cupertino, both of Calif.

[73] Assignee: Ricoh Company, Ltd., Tokyo, Japan

[21] Appl. No.: 08/936,336

[22] Filed: Sep. 24, 1997

[51] Int. Cl.[6] .................................................. G06F 17/00
[52] U.S. Cl. .................................. 707/104; 707/3; 707/4
[58] Field of Search .............................. 707/3, 2, 4, 104, 707/101; 382/283, 248, 232; 395/356

[56] References Cited

U.S. PATENT DOCUMENTS

| | | | |
|---|---|---|---|
| 4,974,034 | 11/1990 | Rabb et al. | 355/319 |
| 5,367,672 | 11/1994 | Takagi | 707/3 |
| 5,446,524 | 8/1995 | Koike | 355/208 |
| 5,465,353 | 11/1995 | Hull et al. | 395/600 |
| 5,499,108 | 3/1996 | Cotte et al. | 358/400 |
| 5,553,277 | 9/1996 | Hirano et al. | 707/104 |
| 5,590,317 | 12/1996 | Iguchi et al. | 707/2 |
| 5,604,824 | 2/1997 | Chui et al. | 382/248 |
| 5,668,897 | 9/1997 | Stolfo | 382/283 |
| 5,748,780 | 5/1998 | Stolfo | 382/232 |
| 5,748,931 | 5/1998 | Jones et al. | 395/356 |
| 5,761,655 | 6/1998 | Hoffman | 707/4 |

FOREIGN PATENT DOCUMENTS

| | | | |
|---|---|---|---|
| 0601759A1 | 6/1994 | European Pat. Off. | G06F 15/401 |
| 0631245A2 | 12/1994 | European Pat. Off. | G06F 15/403 |
| 01722145A1 | 7/1996 | European Pat. Off. | G06F 17/30 |
| 6-189064 | 7/1994 | Japan | H04N 1/00 |
| 2-288509 | 10/1995 | United Kingdom | G03G 15/00 |
| WO95/12173A3 | 4/1995 | WIPO | G06F 17/30 |

OTHER PUBLICATIONS

Dacheng Wang et al., "Classification of Newspaper Image Blocks Using Texture Analysis," SUNY Buffalo Report (undated).

Duda & Hart, "Pattern Classification and Scene Analysis," (John Wiley & Sons 1973), pp. 228–237.

Robert M. Haralick et al, "Textural Features for Image Classification," IEEE Trans. Sys., Man, Cybernetics, vol. SMC–3, No. 6, Nov. 1973.

Kenneth I. Laws, "Texture Energy Measures," Processing Image Understanding Workshop, Nov. 1979.

C.H. Chen, "A Study of Texture Classification Using Spectral Features," ICPR, Munich, Oct. 1982, pp. 1074–1077.

Lü Yan, "Interest Operator and Fast Implementation," IDP, 1988.

A. Lawrence Spitz, "Skew Determination in CCITT Group 4 Compressed Document Images," pp. 11–25 (last reference 1989).

J.J. Hull, "Document Image Matching and Retrieval with Multiple Distortion–Invariant Descriptors," pp. 379–396, IAPR Workshop DAS 1994.

Anil K. Jain et al, "Unsupervised Texture Segmentation Using Gabor Filters," Pattern Recognition, vol. 24, No. 12, pp. 1167–1186, 1991.

(List continued on next page.)

*Primary Examiner*—Wayne Amsbury
*Assistant Examiner*—Thuy Pardo
*Attorney, Agent, or Firm*—Townsend and Townsend and Crew LLP

[57] ABSTRACT

An interactive database organization and searching system employs text search and image feature extraction to automatically group documents together by appearance. The system automatically determines visual characteristics of document images and collect documents together according to the relative similarity of their document images.

32 Claims, 12 Drawing Sheets

OTHER PUBLICATIONS

Dan S. Bloomberg, "Multiresolution Morphological Analysis of Document Images," SPIE vol. 1818, Visual Communications and Image Processing 1992.

Daniel P. Huttenlocher et al., "Comparing Image Using the Hausdorff Distance," IEEE Transactions on Pattern Analysis and Machine Intelligence, vol. 15, No. 9, pp. 850–863, Sep. 1993.

William Rucklidge, "Efficient Computation of the Minimum Hausdorff Distance for Visual Recognition," Technical Report, Dept. of Computer Science, Cornell University, Ithaca, New York, pp. 1–169, Sep. 1994.

D. Bloomberg, et al., "Extraction of Text–Related Features for Condensing Image Documents," SPIE vol. 2660, pp. 72–88, 1996.

D. Doermann, et al., "The Development of a General Framework for Intelligent Document Retrieval," IAPR Workshop DAS, Oct. 1996.

M.Y. Jaisimha et al., "DocBrowse: A System for Textual and Graphical Querying on Degraded Document Image Data," IAPR Workshop DAS, Oct. 1996.

NAVIGATION SYSTEM FOR DOCUMENT IMAGE DATABASE

CROSS-REFERENCE TO RELATED APPLICATIONS

The following related commonly-owned copending application is being filed concurrently and is hereby incorporated by reference in its entirety for all purposes:

John F. Cullen, et. al., entitled, "Method and System for Document Image Feature Extraction,", U.S. patent application Ser. No. 08/936,339, now pending.

Further, this application incorporates by reference the following related U.S. Patent Applications in their entirety for all purposes:

U.S. patent application Ser. No. 08/431,059, Mark Peairs, entitled, "Iconic Paper"; and now U.S. Pat. No. 5,717,940

U.S. patent application Ser. No. 08/609,641, John F. Cullen, et. al. entitled, "Image Database Browsing and Query Using Texture Analysis", filed Mar. 1, 1996, now pending

BACKGROUND OF THE INVENTION

This invention relates to document management systems and more particularly to providing a method of navigating through a database of document images.

The proliferation of low-cost, high-capacity electronic storage of document images has enabled users to keep ever increasing amounts and varieties of documents, previously stored in hard copy format, as electronic information online. While this revolution in storage technology has reduced the cost of document storage, it brings with it the need for more efficient methods of searching through a myriad of online documents to find a particular document or set of documents of interest to the user.

Methods for locating a document of interest have been rudimentary at best. Typically, in these methods, documents are scanned into the computer and an Optical Character Recognition ("OCR") program converts the image into a textual file. Next, a form of keyword matching search is performed, with the system either scanning the entire text of all documents, or a set of carefully chosen keywords thought to be representative of the document by a person who initially classified the document. The problem with the first approach is the high search cost involved with traversing a large number of documents in their entirety. The difficulty with the second approach is that different persons will employ different strategies to filing and retrieval. As the heterogeneity of documents contained in databases increases, the reliability of these traditional search methods diminishes.

Recognizing the opportunity to exploit the information content of the image portion of documents, several attempts have been made to search for documents based upon matching of small images contained in the documents. For example, M. Y. Jaisimha, A. Bruce and T. Nguyen in their work, "DocBrowse: A system for Textual and Graphical Querying on Degraded Document Image Data" describe a system which searches for documents based upon company logos in letterheads. D. Doermann, et. al. in "Development of a General Framework for Intelligent Document Retrieval," outline a system for matching documents based upon generation and matching of an image descriptor which describes low-level features and high-level structure of a document. Unfortunately, this method requires intensive processing of the image information, which greatly curtails its use in most commercial applications.

While such methods provide document search capability via elemental matching of image characterization vectors, they do not provide a useful method to organize a large database of document images. These and other shortcomings indicate that what is needed is a method and system for efficiently searching a database of document images. This method would expedite search by organizing the database according to the textual as well as the visual characteristics of document images.

SUMMARY OF THE INVENTION

The present invention provides an interactive database organization and searching system which employs text search and image feature extraction to automatically group documents together by appearance. The system automatically determines visual characteristics of document images and collect documents together according to the relative similarity of their document images.

One representative embodiment is a method that includes the steps of accepting from the user a textual string keyword to serve as the basis for an initial search, searching the textual component of document images in the database for the keyword, grouping document images having textual components which contain the keyword into clusters of document images based upon processing of the features extracted from compressed representations of the document images, displaying a representative document image for each cluster of document images, and accepting input from the user indicating a particular cluster of document images upon which the system may perform further search.

Another representative embodiment is a method that includes the steps of grouping document images together based upon feature information to form clusters of document images having similar feature characteristics, selecting a representative document image from each cluster of document images, displaying the representative document image to the user, and accepting input from the user to select a cluster of images upon which the system may perform further search.

A related embodiment extracts feature information from the compressed image prior to performing the grouping steps described above. Another related embodiment also permits the user to specify a desired number of clusters.

The invention will be better understood by reference to the following detailed description in connection with the following drawings.

DESCRIPTION OF PREFERRED EMBODIMENTS

Representative System Suited to Practice the Invention

Figure 1:
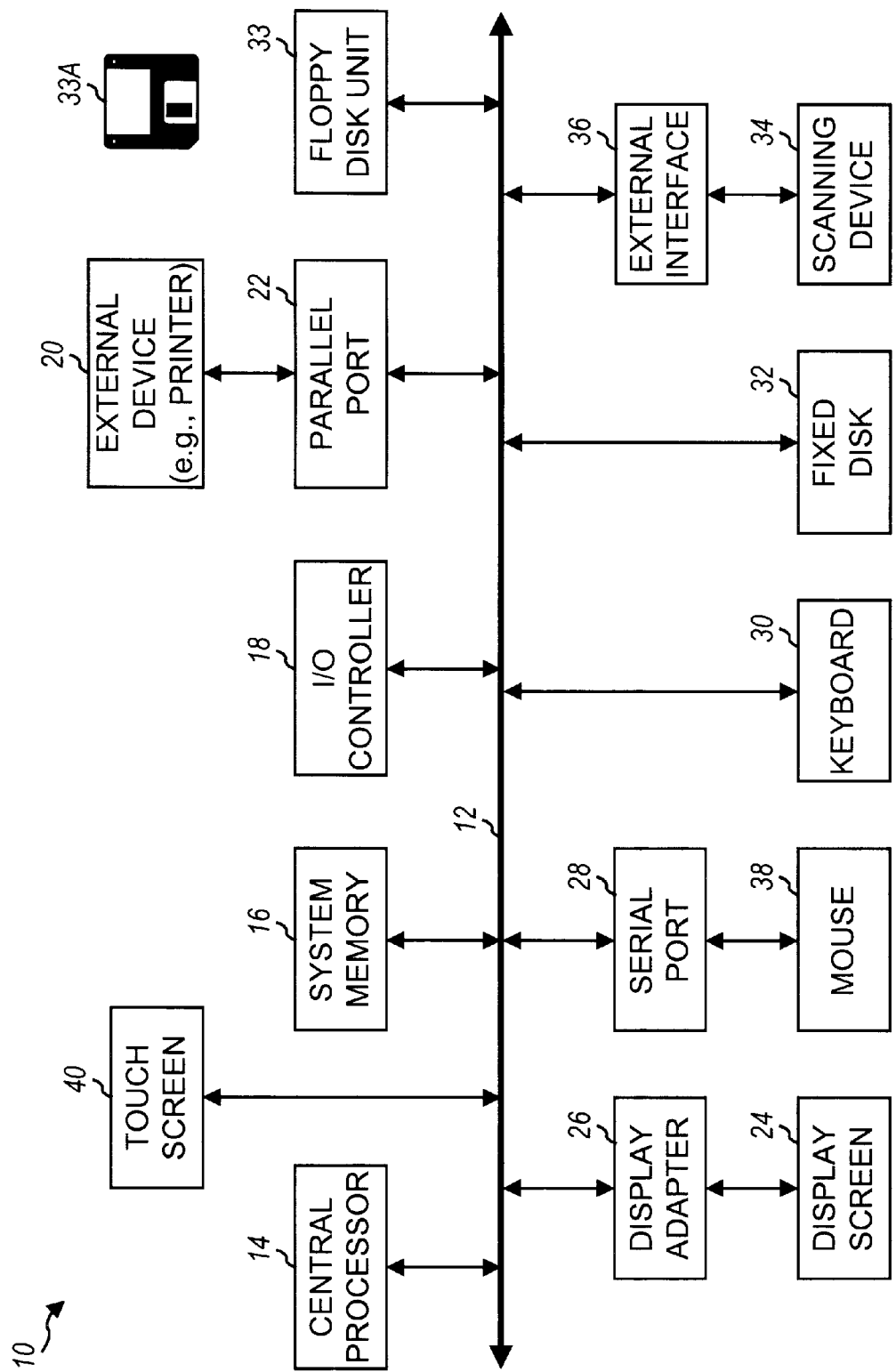
FIG. 1 depicts a representative computer system suitable for implementing the invention.

In a typical installation, the invention will be practiced on a computer system with the basic subsystems such as depicted in FIG. 1. In the representative system of FIG. 1, a computer system 10 includes bus 12 which interconnects major subsystems such as central processor 14, system memory 16, input/output (I/O) controller 18, and external device such as a printer 20 via parallel port 22, display screen 24 via display adapter 26, serial port 28, keyboard 30, fixed disk drive 32 and floppy disk drive 33 operative to receive a floppy disk 33A. Many other devices can be connected such as scanning device 34 connected via external interface 36, mouse 38 connected via serial port 28 and touch screen 40 connected directly. Many other devices or subsystems (not show) may be connected in a similar manner. Also, it is not necessary for all of the devices shown in FIG. 1 to be present to practice the present invention, as discussed below. The devices and subsystems may be interconnected in different ways from that shown in FIG. 1 without impairing the operation of the system. The operation of a computer system such as that shown in FIG. 1 is readily known in the art and is not discussed in detail in the present application. Source code to implement the present invention may be operably disposed in system memory 16 or stored on storage media such as fixed disk 32 or floppy disk 33A. An image database may also be stored on fixed disk 32.

Display screen 24 is similar to that in use on standard computers such as personal computers, workstations or mainframe computers employing a CRT screen or monitor. Various forms of user input devices may be used with the present invention. For example, a mouse input device 38 that allows a user to move a pointer displayed on the display screen in accordance with user hand movements in a standard user input device. A mouse usually includes one or more buttons on its surface so that the user may point to an object on the screen by moving the mouse and may select the object, or otherwise activate the object, be depressing one or more buttons on the mouse. Alternatively, a touch screen allows a user to point to objects on the screen to select an object and to move the selected object by pointing to a second position on the screen. Various buttons and controls may be displayed on the screen for activation by using the mouse or touch screen. Fixed disk drive 32 may be a hard disk drive or an optical drive or any medium suitable for storing a database of document images.

Overview of Querying Operation Performed on the Image Database

One unique and innovative feature of this invention is the intuitive manner in which image based search can be conducted on the documents in the database without requiring the user to build a representative document image as is required in the art. See e.g. co-pending and co-assigned U.S. patent application Ser. No. 08/609,641, entitled, "Image Database Browsing and Query Using Texture Analysis", which is incorporated herein by reference in its entirety for all purposes.

Figure 2A:
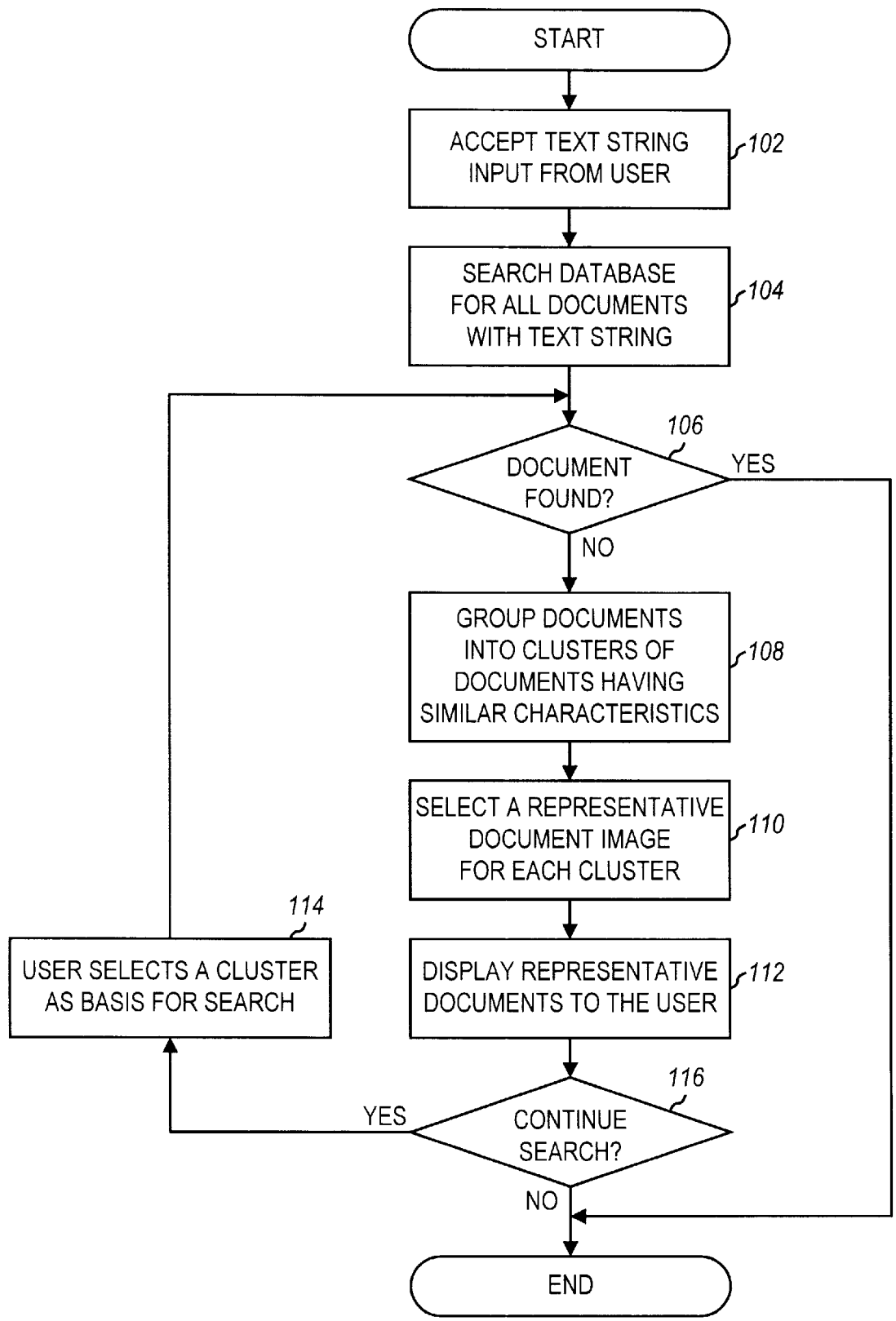
FIG. 2A depicts a flow chart describing a representative querying operation of the database in an embodiment of the invention.

In one particular embodiment of the invention depicted in FIG. 2A, the textual portion of documents is extracted from document images using OCR scanning and is made available in the database. This database can reside in any of multiple storage media in the computer system, such as the fixed disk 32 or system memory 16. The search procedure commences with an initial query step 102, in which the user inputs one or more keywords (i.e. text string or a combination of text strings) into the system via an input device such as terminal keyboard 30 and display screen 24.

Searching proceeds for the text string in the textual portions of the documents contained in the database in text based search step 104. If the text based search yields the document of interest, then the user may discontinue any further processing in step 106. Otherwise, documents containing the text string become the basis for image based search. In a preferred embodiment, features extracted from compressed representations of document images are available in the database. Documents meeting the text based search are grouped together in grouping step 108 to form clusters based upon similarity of the features extracted from each document image. A representative document image is selected in step 110 for each cluster of document images formed in the grouping step 108.

Figure 4:
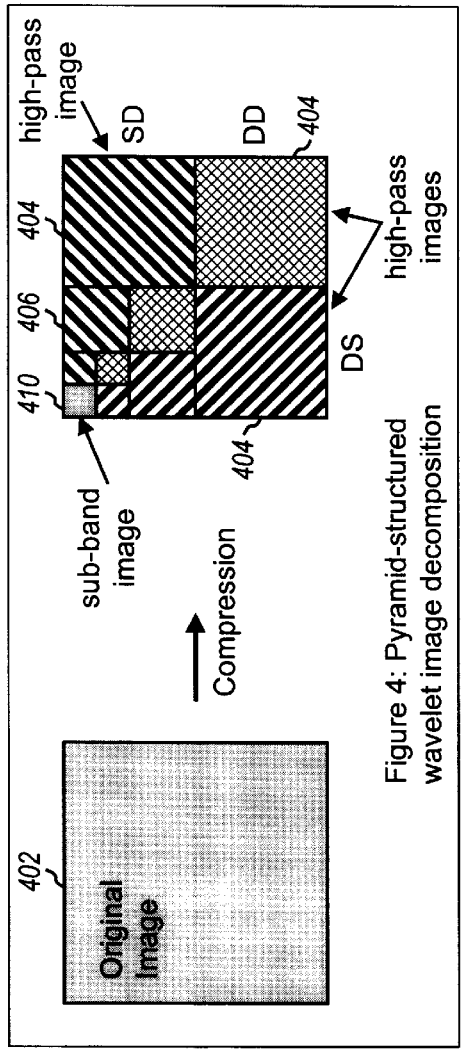
FIG. 4 depicts the use of compression on a document image to facilitate low cost storage and expedient manipulation of image components by the system.

The representative document images are displayed to the user on the display 24 in display step 112. In a preferable embodiment, as depicted in FIG. 4, a compressed representation of each representative document image is displayed as an icon 402 using a web browser 404 as a user interface. A related embodiment displays uncompressed representative images. In the preferable embodiment, the user may select a particular cluster as the basis for further search by indicating to the system, with a mouse 38 or other input device, the representative document icon for the cluster which is to be the basis of further search as in step 114.

Search proceeds by applying the grouping step to the selected cluster of documents, sub-dividing this cluster into a new set of clusters 108, each having a new representative document image. Search continues until either the document is found 106, or the user chooses to discontinue the search 116.

Figure 2B:
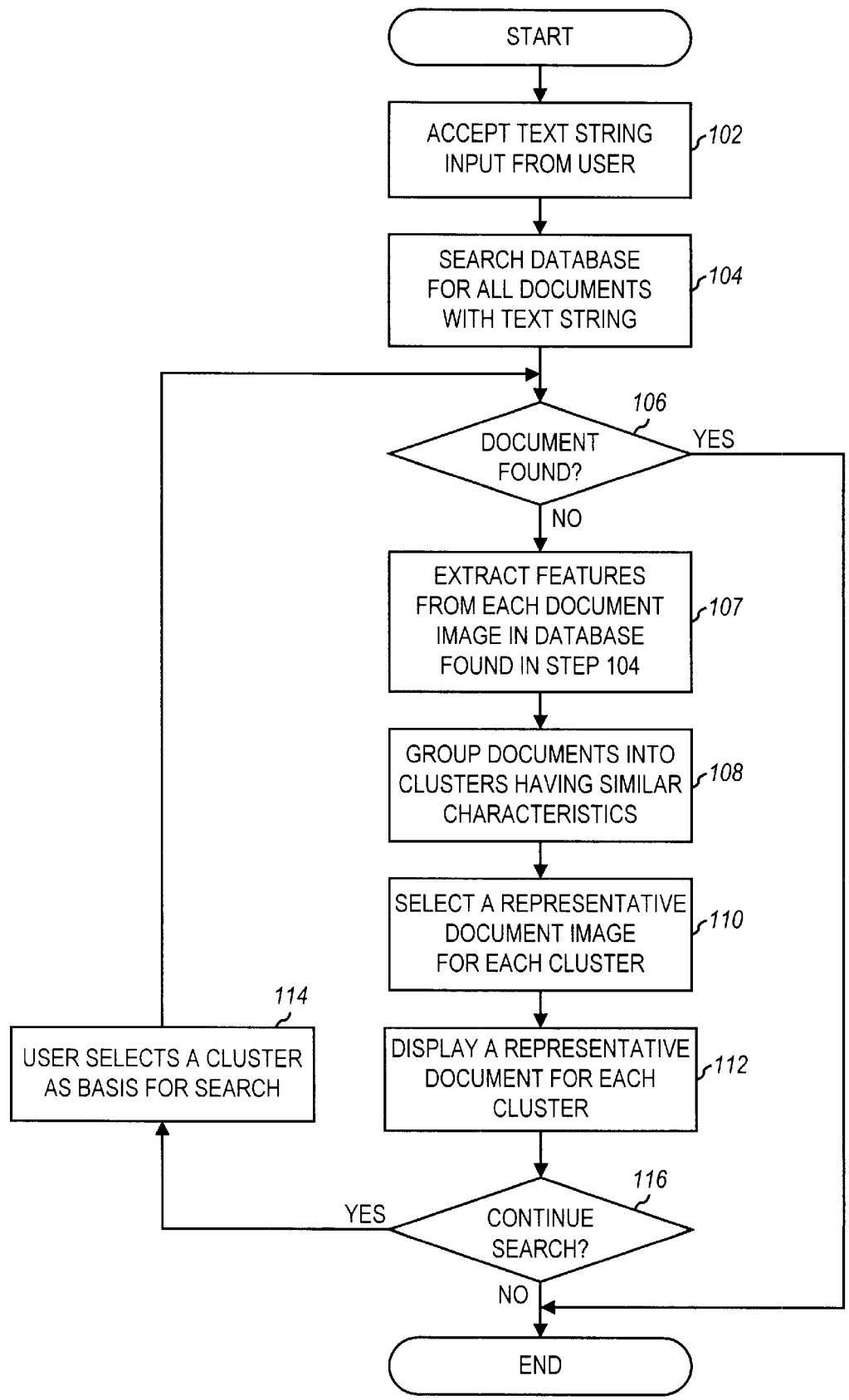
FIG. 2B depicts a flow chart describing a representative querying operation of the database in an alternative embodiment of the invention.

In a related embodiment depicted in FIG. 2B, a compressed representation of each document image is made available in the database. Features are extracted from these compressed representations in an extraction step 107, interposed between document complete step 106 and grouping step 108. Search proceeds with grouping step 108 as in the prior embodiment.

Another related embodiment also includes the step of permitting the user to choose the number of clusters desired before the first grouping step 108, or at any time while navigating the database prior to a new application of the grouping step.

Figure 3A:
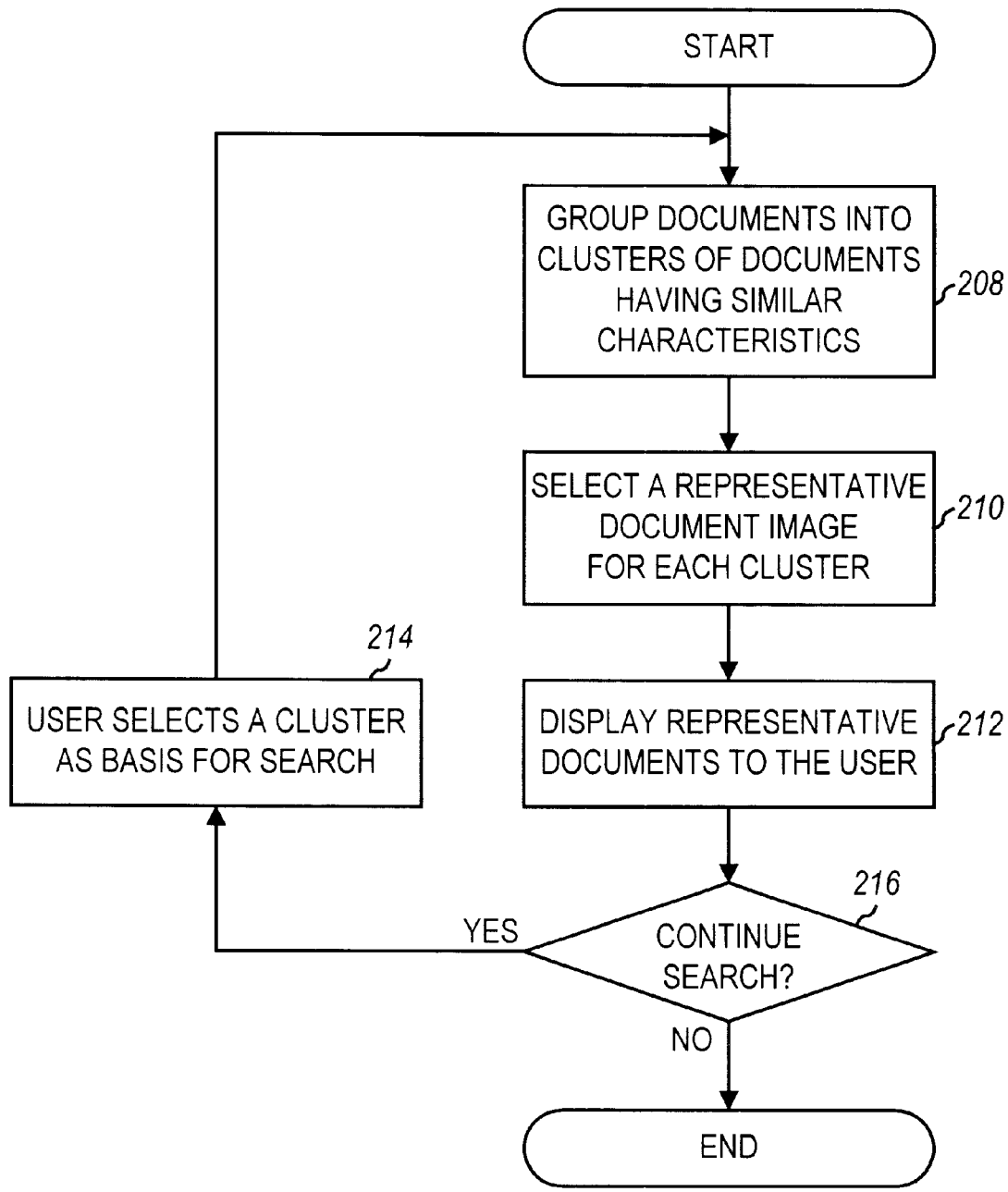
FIG. 3A depicts a flow chart of the steps performed in organizing the database in an embodiment of this invention.

An alternative embodiment of the invention is depicted in FIG. 3A. As in the embodiment discussed above features extracted from compressed representations of document images are preferably available in the database. Documents are grouped together to form clusters in grouping step 208 based upon similarity of the features extracted from each document image. A representative document image is selected in step 210 for each cluster of document images formed in the grouping step 208. The representative document images are displayed to the user on the display 24 in display step 212. In a preferable embodiment, the system accepts from the user input parameters upon which further search may continue in step 214. Search continues until the user chooses to discontinue 216.

Figure 3B:
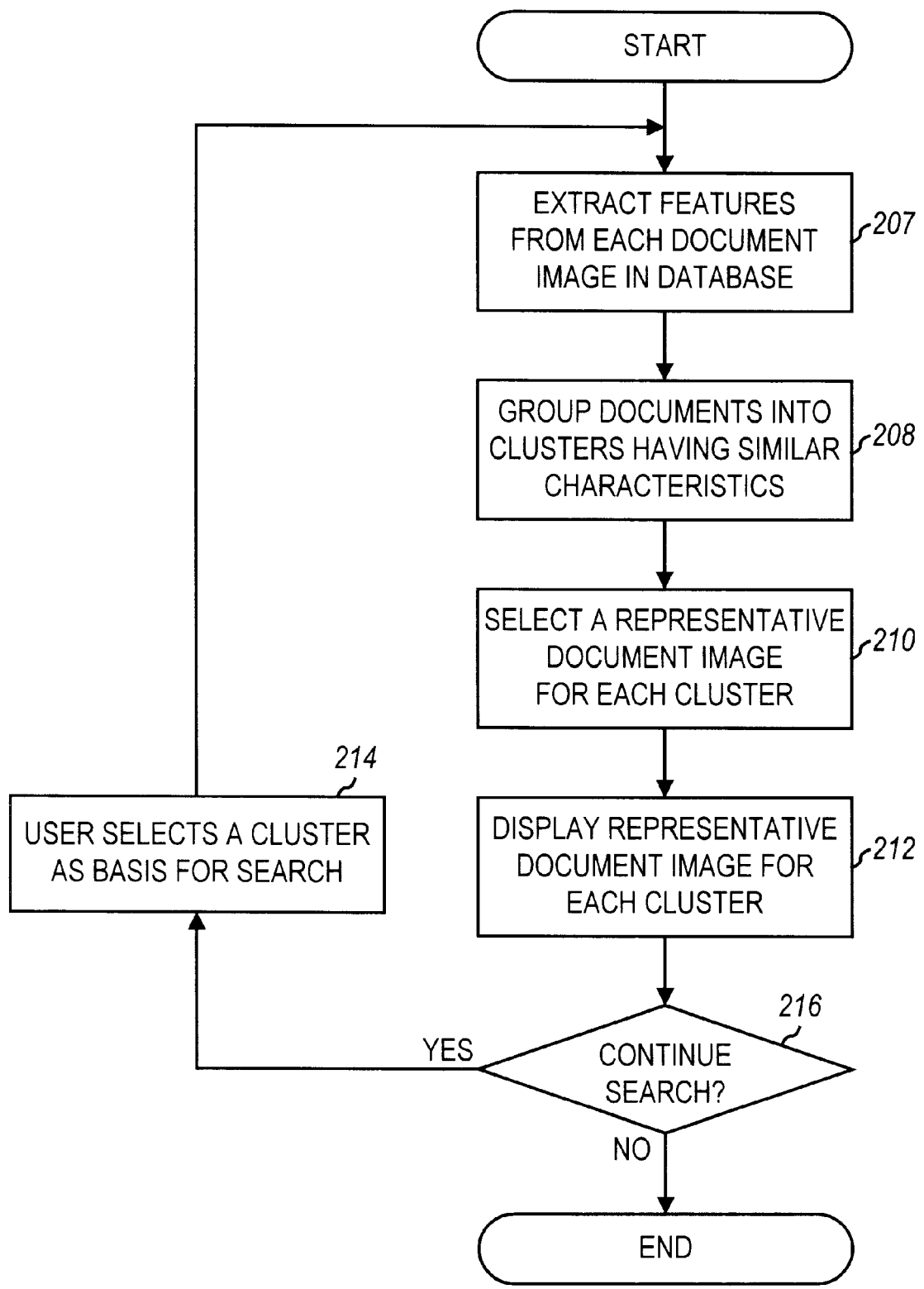
FIG. 3B depicts a flow chart of the steps performed in organizing the database in an alternate embodiment of this invention.

In a related embodiment depicted in FIG. 3B, a compressed representation of each document image is made available in the database. Features are extracted from these compressed representations in an extraction step 207 before grouping step 208. Search proceeds with grouping step 208 as in the prior embodiment.

Another related embodiment also includes the step of permitting the user to choose the number of clusters desired before the first grouping step 208, or at any time while navigating the database prior to a new application of the grouping step.

Figure 7:
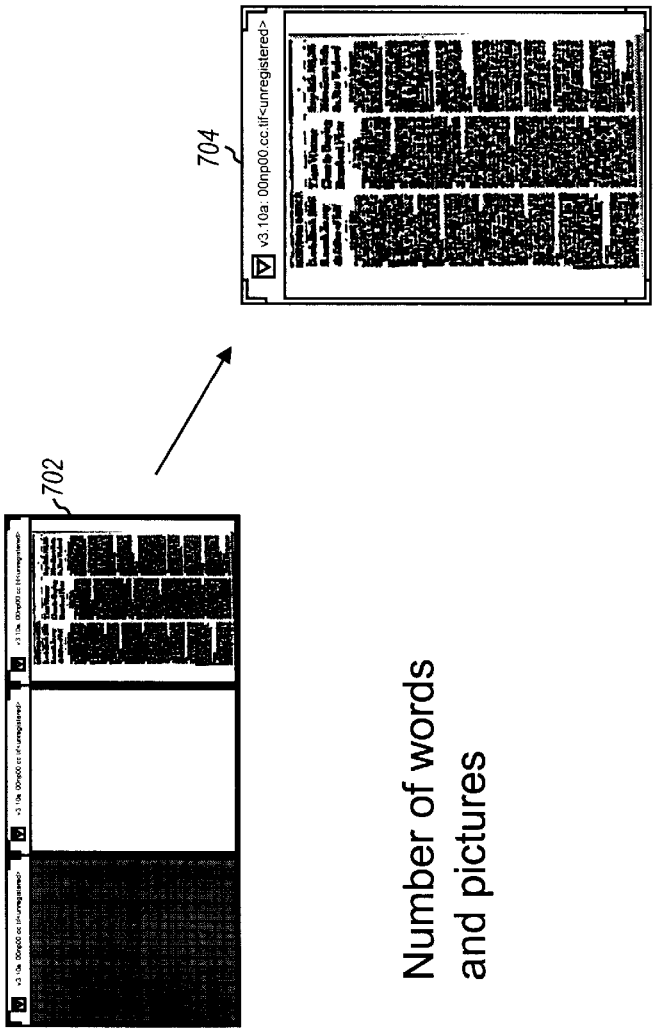
FIG. 7 depicts extraction of connected components of number of words and number of pictures from high frequency image information.
Figure 8:
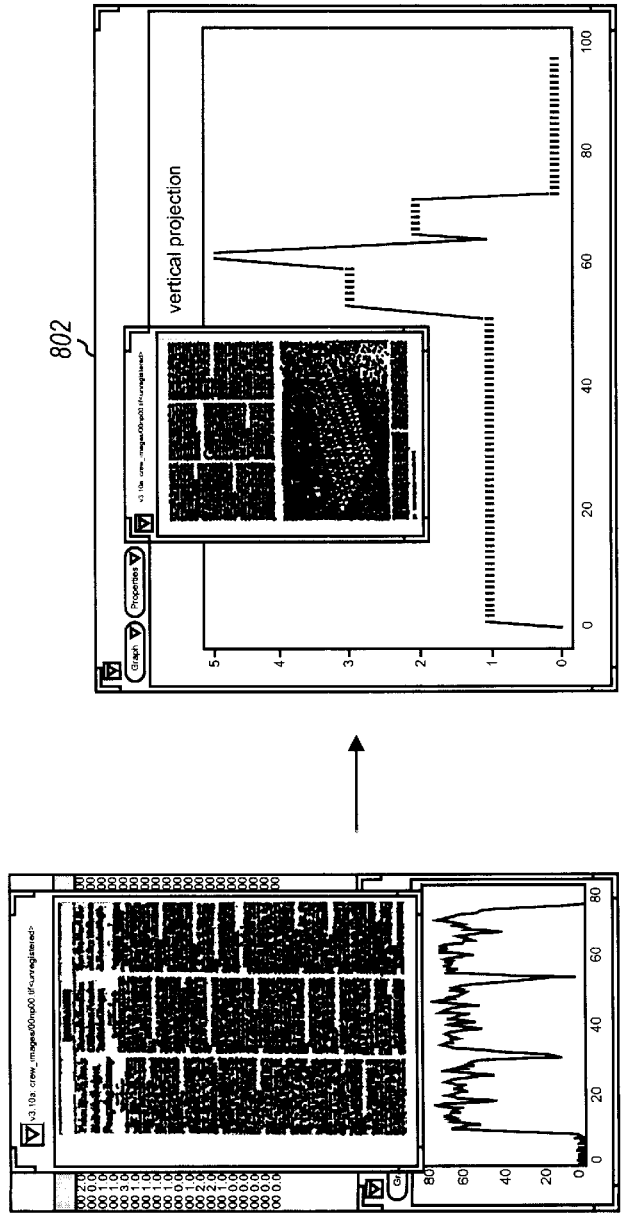
FIG. 8 depicts extraction of connected components of number of columns from high frequency image information.
Figure 9:
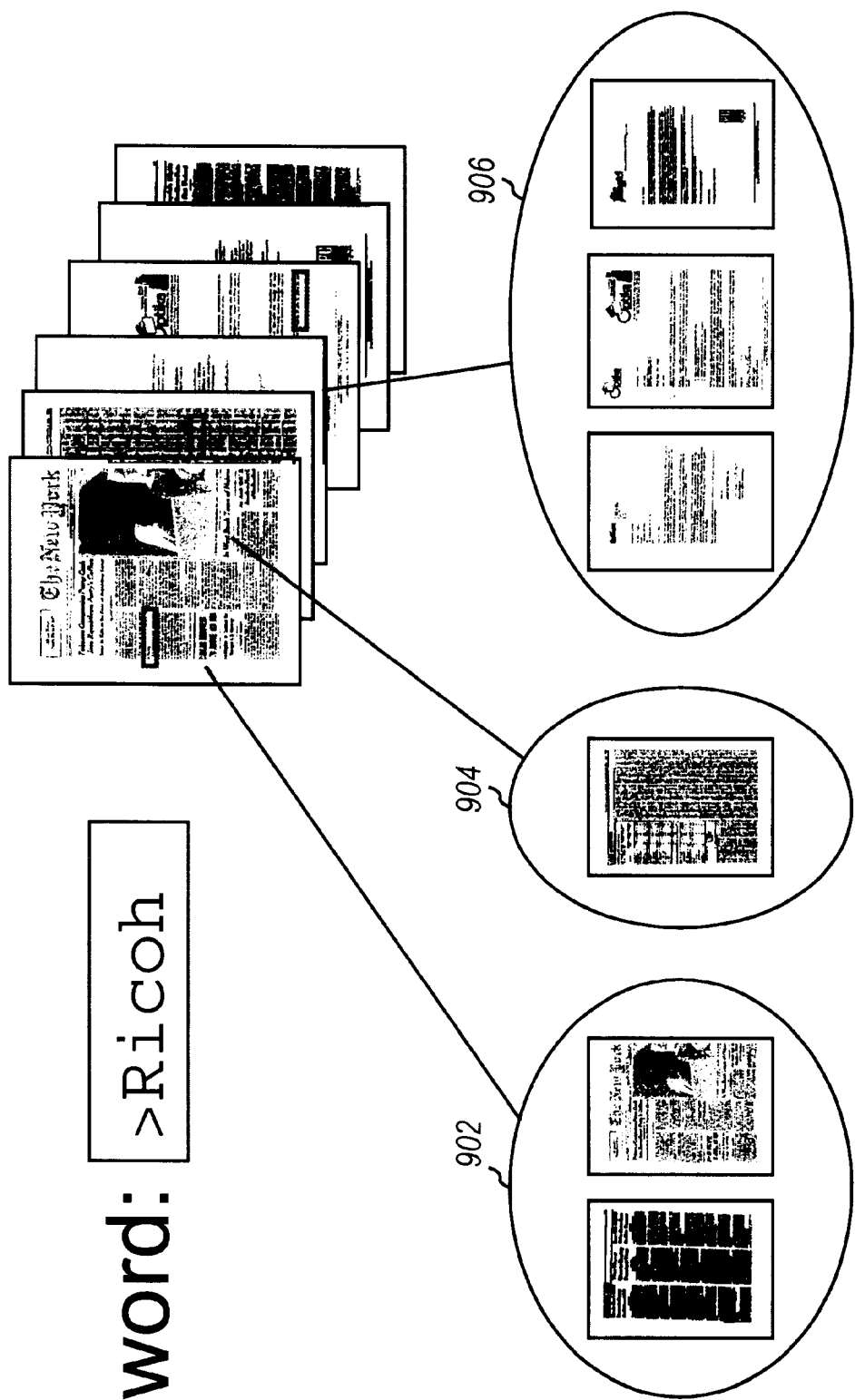
FIG. 9 depicts the clustering of document images aspect of the invention.

FIGS. 4–8 demonstrate the use of image processing techniques of compression, FIG. 4; features extraction, FIGS. 5, 6, 7 and 8; and grouping, FIG. 9 which form the basis of the search technique. These techniques are also discussed in a co-assigned copending U.S. patent application Ser. No. 08/936,339 entitled "Method and System for Document Image Feature Extraction," which is incorporated herein by reference in its entirety for all purposes.

Figure 10:
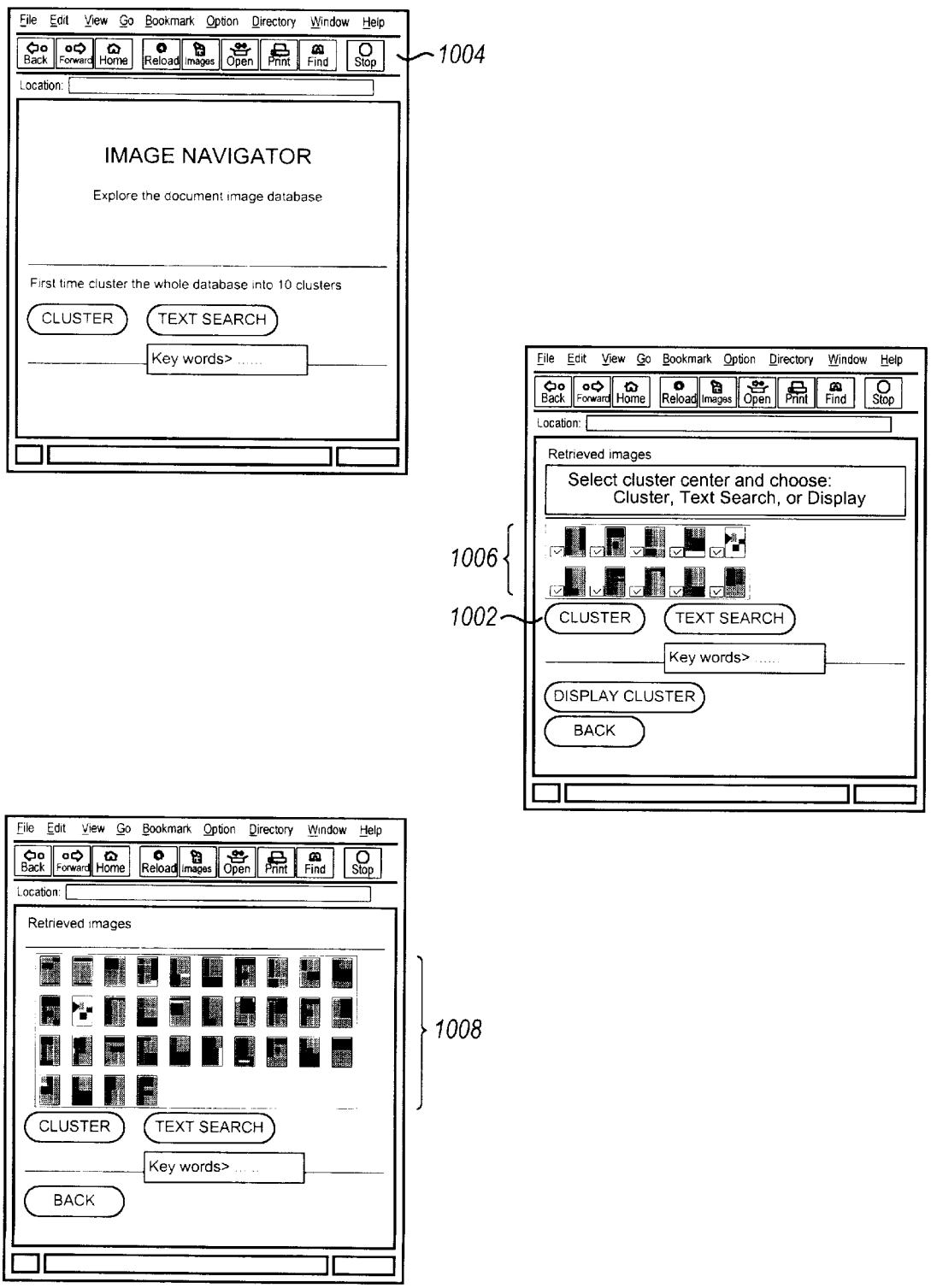
FIG. 10 depicts the use of a web browser to implement the display and user interface portions of the invention.

FIG. 10 depicts the use of a web browser to implement the display and user interface portions of the invention.

Compression Techniques

Figure 5:
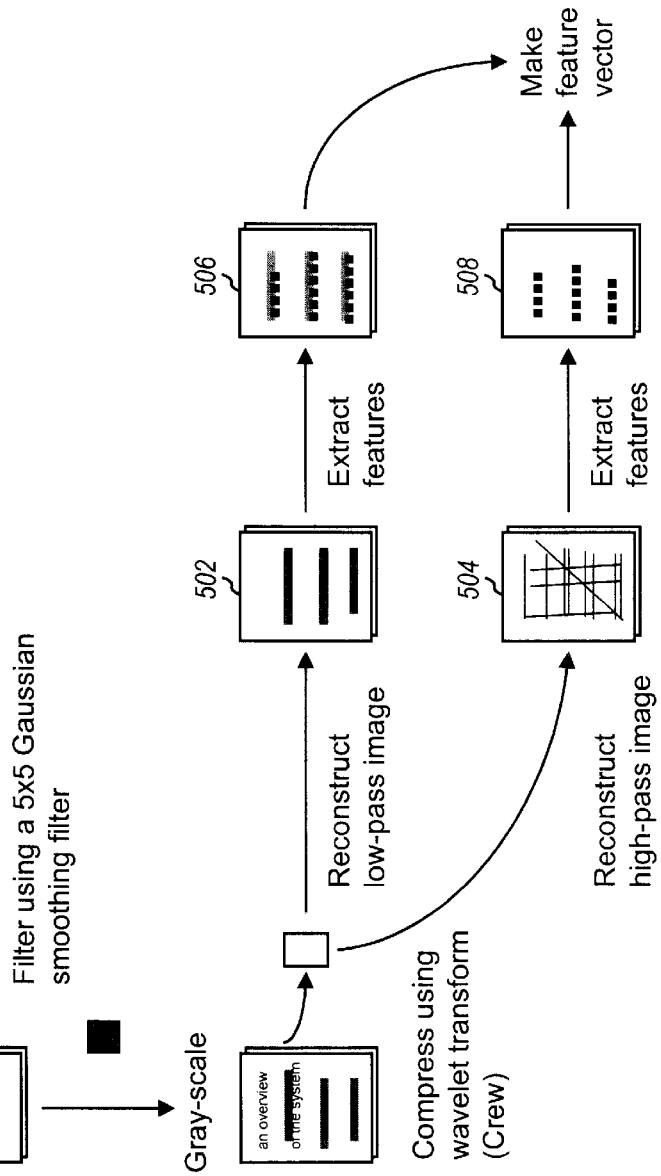
FIG. 5 depicts extraction of image feature information from compressed images to serve as the basis for image grouping.

Compression reduces the cost of storing large quantities of document images in a database. Each document image is compressed via a compression technique such as wavelet compression (See e.g. IEEE Data Compression Conference, CREW: Compression with Reversible Embedded Wavelets, March 1995, which is incorporated herein by reference in its entirety for all purposes), or other techniques for compression known in the art. FIG. 4 is illustrative of wavelet compression, which operates by recursively applying a pyramidal transform to the image data 402, dividing the image into high frequency information 404 and low frequency information 406. CREW has several advantages in this application. It decomposes an image into high and low pass components relatively quickly. It gives a lossy compression of 20:1, with minimal noticeable image degradation. FIG. 5 is illustrative of the splitting off of low frequency image information 502 and high frequency image information 504 in one embodiment of the invention to extract different image features 506, 508.

In one embodiment of the invention, the low pass component of an image 410 is used as an icon for indexing into document image databases.

Feature Extraction

Figure 6:
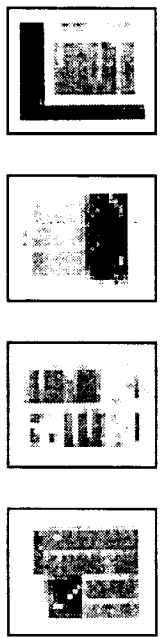
FIG. 6 depicts extraction of statistical moments from low frequency image information.
Figure 6:
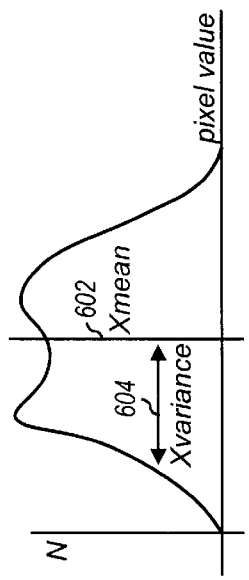

Feature extraction on the low frequency image information resulting from the compression step yields the statistical moments of the image pixel values as depicted in FIG. 6. In one particular embodiment of the invention, the mean 602 and variance 604 of the pixel values are the statistical moments which are calculated from low frequency information. FIGS. 7 and 8 are illustrative of features extraction applied to the high frequency image information resulting from the compression step. Connected components are extracted. In one particular embodiment of the invention, the features of total number of text words 702, pictures 704 and text columns 802, are extracted from the high frequency image information. Feature extraction is described in co-assigned copending U.S. patent application Ser. No. 08/936,339 entitled, "Method and System for Document Image Feature Extraction," (referenced above).

Grouping Document Images into Clusters

Document images are grouped together based upon feature information to form clusters of document images, each cluster containing document images having similar feature characteristics. One method of performing grouping is to employ a k-means algorithm. In one embodiment of the invention depicted in FIG. 9, grouping of images is performed into a selected number of groups 902, 904, 906. The desired number of groups may be chosen by the user, based upon the user's preference for granularity in the search vs the number of groups the user can track without promoting confusion. Grouping can be performed recursively on the documents within any group, forming a hierarchical organization in the database.

Displaying a Representative Document Image

A representative document image for display to the user is automatically selected by the system from each cluster of document images. In one embodiment of the invention, a center is calculated and the nearest image to that center is labeled as the characteristic image for each cluster generated by the grouping step. In a preferred embodiment of the invention, a web browser is used as the user interface for displaying document image representations and permitting the user to indicate which document image cluster should serve as the basis of further searching. As depicted in FIG. 10, a compressed representation of each representative document image is displayed as an icon 1002 using a web browser 1004 as a user interface. A related embodiment displays non-compressed representative images. In a preferable embodiment, the user may select a particular cluster as the basis for further search by indicating to the system, with a mouse 38 or other input device, the representative document icon for the cluster which is to be the basis of further search 1006. Search continues by applying the grouping step to the selected cluster of documents, subdividing this cluster into a new set of clusters 1008, each having a new representative document image. In an alternative embodiment non-compressed document images are displayed.

Searching the World Wide Web for Document Images

In a related embodiment, documents retrieved from World Wide Web search engines, e.g., Altavista or Infoseek, may be browsed using methods according to the invention. Users typically receive a multiplicity of documents from a multiplicity of different sources returned in response to a simple text-based query. It is difficult to determine which documents are actually of interest. However, users desirous of a particular type of document distinguishable by its visual appearance, e.g., a scientific paper that contains mostly two-column text, can quickly obtain only those documents using techniques according to the invention.

The invention has now been explained with reference to specific embodiments. Other embodiments will be apparent to those of ordinary skill in the art. It is therefore not intended that the invention be limited, except as indicated by the appended claims.

What is claimed is:

1. A method for searching for a particular document image in a database containing a plurality of document images, each document image having a textual component, a compressed representation, and a non-compressed representation, said method comprising:

accepting text from a user as a keyword to search;

searching the textual component of said plurality of document images for said keyword;

detecting similarity of features extracted from document images having textual components that contain said keyword, wherein said detecting is based on processing of the compressed representation or the non-compressed representation of the document images;

grouping document images having similar extracted features into a plurality of clusters of document images;

selecting a representative document image for each of the plurality of clusters of document images;

displaying the representative document image for each of the plurality of clusters of document images; and accepting input from the user indicating a particular cluster of document images.

2. The method of claim 1 wherein said compressed representation is generated from said document image by applying a CREW algorithm to said document image.

3. The method of claim 1 wherein said detecting comprises:

extracting image feature information about said particular document image; and applying a clustering algorithm to said image feature information to form said plurality of clusters of document images.

4. The method of claim 3 wherein said extracting step comprises computing statistical information for said particular document image.

5. The method of claim 4 wherein said extracting step additionally comprises computing component connections for said particular document image.

6. The method of claim 3 wherein said clustering algorithm comprises a "k-means" clustering algorithm.

7. A method for searching for a particular document image in a database containing a plurality of document images, wherein each document image has a textual component a compressed representation and a non-compressed representation, said method comprising:

accepting text from a user as a keyword to search;

searching the textual component of said plurality of document images for said keyword;

grouping document images having textual components that contain said keyword into a plurality of clusters of document images based upon processing of the compressed representation or the non-compressed representation of the document images, wherein said processing includes extracting image feature information about said particular document image, and applying a "k-means" clustering algorithm to said image feature information to form said plurality of clusters of document images;

displaying, based on said processing, a representative document image for each of the plurality of clusters of document images; and accepting input from the user indicating a particular cluster of document images, wherein said plurality of clusters consists of between 5 and 10 document images.

8. The method of claim 1 wherein said selecting comprises:

calculating a center for each cluster of document images; and selecting a document image nearest to said center as the representative document image.

9. The method of claim 1 further comprising:

iteratively applying the grouping, selecting displaying, and accepting to form a hierarchical search pattern through the database.

10. The method of claim 1 wherein said displaying comprises:

displaying said compressed representation of each representative document image using a web browser.

11. The method of claim 1 wherein said displaying comprises:

displaying said representative document image using a web browser.

12. A method for organizing a plurality of document images in a database comprising:

compressing each particular document image in said plurality of document images;

extracting feature information about said particular document image;

detecting similarity of features extracted from said plurality of document images, wherein said detecting is based on processing of a compressed representation or a non-compressed representation of the document images;

grouping said plurality of document images together to form clusters of document images;

selecting a representative document image for each of the clusters of document images; and displaying each representative document image.

13. The method of claim 12 wherein said compressing comprises applying a CREW algorithm to said particular document image.

14. The method of claim 12 wherein said extracting comprises:

computing statistical information from said particular document image; and extracting text keywords from textual information contained in said particular document image.

15. The method of claim 14 wherein said extracting additionally comprises computing component connections for said particular document image.

16. The method of claim 12 wherein said grouping comprises applying a "k-means" clustering algorithm to form a plurality of representative document groups.

17. A method for organizing a plurality of document images in a database comprising:

compressing each particular document image in said plurality of document images;

extracting image feature information about said particular document image;

grouping said plurality of document images together to form clusters of document images, wherein said grouping comprises applying a "k-means" clustering algorithm;

selecting a representative document image for each of the clusters of document images; and displaying each representative document image, wherein said clusters include between 5 and 10 document images.

18. The method of claim 12 wherein said selecting comprises:

calculating a center for each cluster of document images; and selecting a document image nearest to said center as the representative document image.

19. The method of claim 12 additionally comprising:

accepting user input selecting a particular representative document image as a starting point for searching; and iteratively applying the grouping, selecting, displaying, and accepting to form a hierarchical search method.

20. The method of claim 12 wherein said displaying comprises displaying said compressed representation of each representative document image using a web browser.

21. The method of claim 12 wherein said displaying comprises displaying said representative document image using a web browser.

22. A computer program product comprising:

code that accepts text from a user as a keyword to search;

code that searches a database of document images, each document image having a textual component and a compressed representation, for document images with textual components that contain said keyword;

code that detects similarity of features extracted from documents having textual components that contain said keyword;

code that groups document images having similar extracted features together into clusters of document images;

code that selects a representative document image for each of the clusters for display;

code that displays selected representative document images; and a computer readable storage medium configured to store the codes.

23. The computer program product of claim 22 further comprising:

code that generates said compressed representation from said document image by applying a CREW algorithm to said document image.

24. The computer program product of claim 22 further comprising:

code that accepts user input selecting images from the selected representative document images for iterative search to form a hierarchical organization of said document images.

25. The computer program product of claim 22 wherein said code that groups document images employs a "k-means" algorithm.

26. A computer program product comprising:

code that accepts text from a user as a keyword to search;

code that searches a database of document images, each document image having a textual component and a compressed representation, for document images with textual components that contain said keyword;

code that groups document images together into clusters of document images based upon processing of the image component of said document images, wherein said clusters include between 5 and 10 document images;

code that selects a representative document image for each of the clusters for display;

code that displays selected representative document images; and a computer readable storage medium configured to store the codes.

27. The computer program product of claim 22 wherein said code that groups document images comprises:

code that extracts image feature information from image component of said document images.

28. The computer program product of claim 27 wherein said code that extracts image feature information comprises:

code that computes statistical information; and code that extracts connected component information.

29. The computer program product of claim 22 wherein said code that selects the representative document image comprises code that calculates a center for each cluster of document images and selects a document image nearest to said center as the representative document image.

30. The computer program product of claim 22 wherein said code that displays selected representative document images comprises code that displays said compressed representations of said document images using a web browser interface.

31. The computer program product of claim 22 wherein said code that displays selected representative document images comprises code that displays said document images using a web browser interface.

32. A document image database organizing system comprising:

an electronic storage unit that stores a document image database;

a display that displays document images;

a processor unit coupled to said electronic storage device and said display, said processor unit operative to:

compress document images;

extract feature information about document images;

detect, based on a compressed representation or a non-compressed representation of said document images similarity of features extracted from said document images;

group said document images into a plurality of clusters of document images according to said detected similarity of features;

select a representative document image for each cluster;

display said representative document image; and accept input commands to manipulate document images.

* * * * *